Patented Oct. 6, 1942

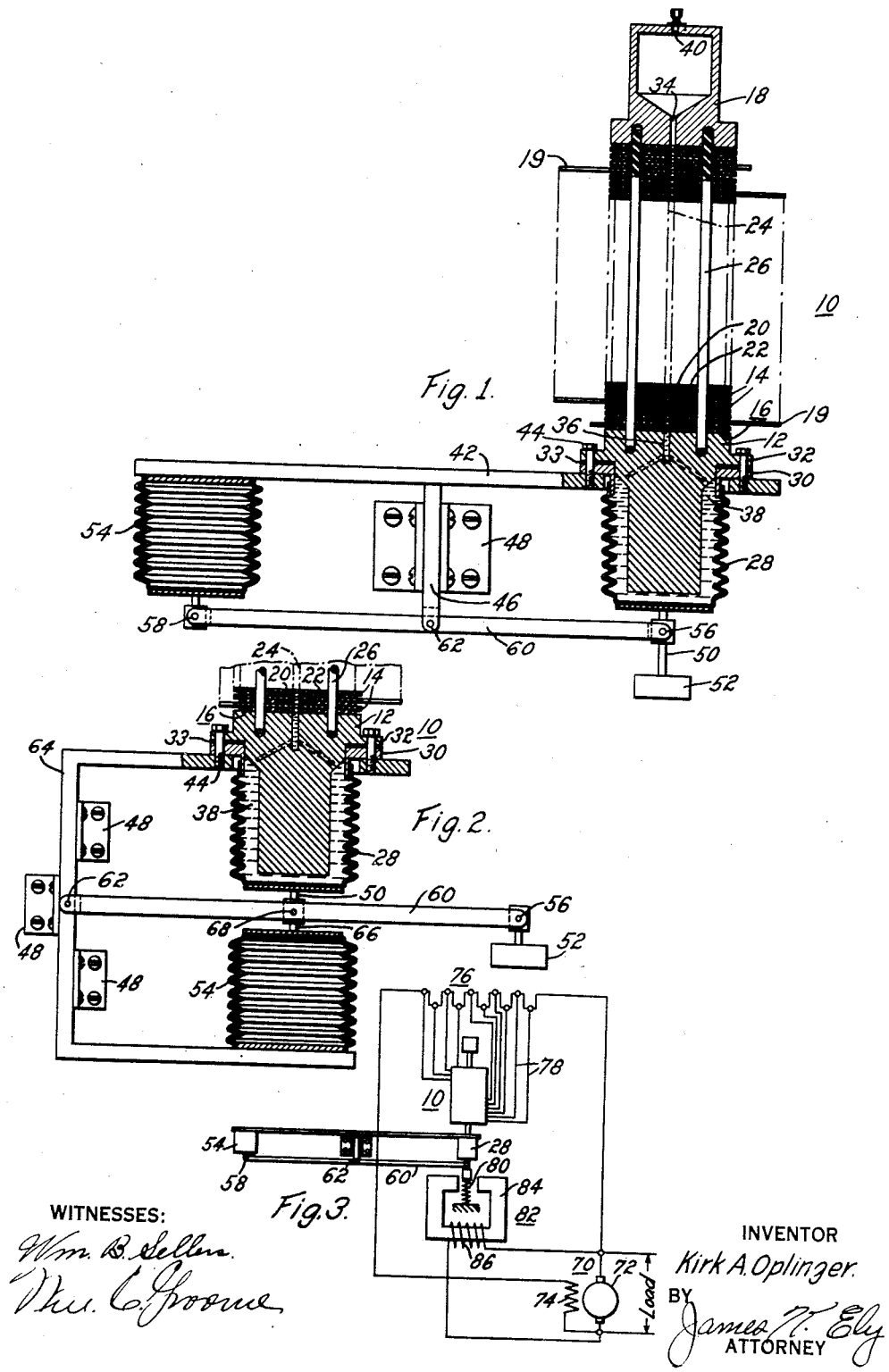

2,298,151

UNITED STATES PATENT OFFICE 2,298,151

SWITCHING APPARATUS

Kirk A. Oplinger, Verona, Pa., assignor to Westinghouse Electric & Manufacturing Company, East Pittsburgh, Pa., a corporation of Pennsylvania Application May 14, 1941, Serial No. 393,319

8 Claims. (Cl. 200—140)

This invention relates to electrical switching apparatus.

It is an object of this invention to provide in a switching apparatus for compensating for any changes in temperature or atmospheric pressure which otherwise would change the operating characteristics of the switching apparatus.

Another object of this invention is to provide in a switching apparatus formed of a plurality of alternately stacked conductor members and spacer members bonded together to provide a well in which a switching fluid is disposed to be delivered by a movement of a bellows to progressively bridge the contact members, for compensating for any changes in temperature or atmospheric pressure to maintain the operation of the switching apparatus substantially unaffected by such changes.

Other objects of this invention will become apparent from the following description, when taken in conjunction with the accompanying drawing, in which:

Figure 1 is a view in elevation and partly in section of the switching apparatus of this invention;

Fig. 2 is a view in elevation and partly in section of another embodiment of the compensated switching apparatus constructed in accordance with this invention; and Fig. 3 is a schematic diagram illustrating the use of the compensated switching apparatus of Fig. 1.

Referring to the drawing and particularly Figure 1, this invention is illustrated by reference to a switching apparatus 10. The switching apparatus 10 comprises a suitable base member 12 on which a plurality of conductor members or leaves 14 are stacked in spaced relation and maintained in spaced relation by means of a plurality of spacer members 16 disposed adjacent the conductor leaves. At the end of the stack opposite the base member 12, there is positioned a suitable container or chamber 18, which functions as a gas chamber.

The construction of the switching apparatus 10 is more clearly described in my copending application Serial No. 387,098, filed April 5, 1941, the construction therein described being made by reference a part of this specification. However, in order that the construction utilized in this invention is understood, a brief description of the elements of the switching apparatus 10 is given.

The conductor members 14 are of any suitable conducting material, such as stainless steel or the like, and are preferably of a substantially rectangular shape having one end tapered to provide a terminal or tap 19 to which leads may be connected.

The spacer members 16 are of any suitable insulating material which can be bonded to the conductor members 14 and which will maintain a predetermined space between the conductor members or leaves 14. Preferably, the spacer members 16 are formed of two washer members 20 and 22 of fibrous material as disclosed in my copending application Serial No. 387,098, the washer 20 fitting within the washer 22 but being of substantially the same thickness. The washer 22 is impregnated with or carries a film of thermoplastic resinous bonding material such as a hydrolyzed polyvinyl ester and is preferably a partially hydrolyzed vinyl acetate while the washer 20 is preferably free from the bonding material.

The conductor members 14 are stacked alternately with the spacer member 16 on the base member 12 with the conductor members 14 so disposed that the terminal 19 of each succeeding conductor member extends outwardly from a different side of the assembly with the terminal being adjacent one edge of the rectangularly shaped conductor member 14. By reversing every fifth conductor member in the stack, it is possible to provide 8 stacks of the staggered terminals extending outwardly from the stacked assembly. Each of the spaced conductor members 14 is also provided with a central opening which cooperates with the opening of the washer 20 when alternately stacked therewith to provide a well 24. Reinforcing rods 26 of fibrous insulating material are also provided and disposed in spaced relation about the well 24 and extend through suitable spaced openings in the conductor members 14 and the washers 22 of the spacer members with their opposite ends terminating in recesses in the chamber 18 and the base member 12.

A bellows 28 secured to an outwardly extending flange member 30 is disposed to be secured to the base member 12. As illustrated, the flange member 30 is secured to the flange 32 of the base member 12 by means of a fibrous gasket 33 of insulating material impregnated or coated with the same thermoplastic bonding medium which is employed in conjunction with the spacer members 16. Both the gas chamber 18 and the base member 12 have openings 34 and 36, respectively, disposed in alignment with the well 24 of the stack, the opening 36 extending through to the space between the bellows and the downwardly extending elongated portion of the base member 12.

With the elements assembled as described, the assembly is subjected to a temperature of about 120° C. while applying a pressure of about 400 pounds per square inch to cause the thermoplastic bonding material carried by the spacer members and gaskets to bond the different elements into an integral leakproof structure. When bonded in this manner, it is found that the bonding material flows to and firmly bonds the reinforcing members 26 in the assembly while the washer 20 of the spacer member limits the flow of the thermoplastic material towards the well 24 formed in the stack.

When thus sealed, the well 24 and the space in the bellows and the gas chamber are evacuated and a predetermined quantity of liquid conducting material, such as the mercury 38, is introduced into the bellows and the well through the duct 40 in the gas chamber 18. A gas, which is capable of reducing arcing, such as hydrogen, is then introduced into the gas chamber and the well above the mercury after which the duct 40 is sealed off as by means of soldering.

As illustrated, the switching apparatus is secured to a supporting arm 42 as by means of the bolts 44, the arm 42 comprising a part of the supporting mounting for the switching apparatus. The supporting mounting is also provided with a depending arm 46 which is secured to suitable angle irons 48 for securing the mounting and the switching apparatus carried thereby to a panel (not shown).

In the embodiment shown in Fig. 1, one end of a driving member 50 is secured to the base of the bellows in any suitable manner, a soft iron member 52 being secured to the other end of the driving member. The member 52 functions as the armature of an electromagnetic device, the details of which are not shown in Fig. 1. In practice, a spring not shown in Fig. 1, is provided for biasing the member 52 in an upward direction whereby the core member 52 is directly responsive to a decrease in the magnetic pull of the electromagnetic device to effect a movement of the bellows to force the mercury upwardly in the well to progressively bridge the spaced conductor members.

As will be understood, any change in the atmospheric pressure or a change in the temperature will affect the operation of the switching apparatus 10 since the volume of the gas above the mercury is directly affected by such changes. For example, an increase in the temperature of the gas above the mercury column in the well 24 causes an expansion of the gas to increase the pressure on the mercury column and elongate the bellows 28 whereas an increase in atmospheric pressure applies an additional force on the bellows tending to force the mercury higher in the well.

In order to compensate for any changes in temperature or atmospheric pressure which may be encountered during service, a sealed bellows 54 containing a gas, such as hydrogen, is also secured to the arm 42 of the mounting at a predetermined distance from the bellows 28. The bellows 54 is preferably of such a size as to have the same volume as the volume of the space in the gas chamber 18 and the well 24 above the mercury column for a predetermined temperature and atmospheric pressure applied to the switching apparatus 10.

As illustrated, both of the bellows 28 and 54 are pivotally secured as at 56 and 58, respectively, to the ends of a lever 60 which is pivotally mounted intermediate its ends as at 62 to the depending arm 46 of the supporting mounting for the switching apparatus. Preferably, with the volume of the compensating bellows 54 equal to the volume of the space within the gas chamber 18 and the well 24 above the mercury column, the lever arms between the pivots 58 and 62 and 56 and 62 of the lever 60 are equal. However, any variation in the volume of the bellows 54 or in the lever arms between the bellows and the pivot 62 may be utilized, the primary consideration being that the moment of the compensating bellows 54 about the pivot 62 should equal the moment of the bellows 28 about the pivot 62 due to the force caused by the change in the volume by the expansion or contraction of the gas in the space within the container 18 and the well 24 upon a change in the temperature or atmospheric pressure. Thus for any increase in the volume of the gas within the switching apparatus 10, such as is found by an increase in the temperature thereof, a corresponding increase in the volume of the gas within the bellows 54 is also obtained whereby both of the bellows 28 and 54 apply forces to the lever 60 which will develop equal moments about the pivot 62 which are substantially equal and opposite to maintain the operation of the switching apparatus substantially unaffected by the change in the temperature. A similar balancing of the moments due to a change in the atmospheric pressure is also obtained.

In the embodiment illustrated in Fig. 2, the switching apparatus 10 only a part of which is shown is secured to a substantially U-shaped supporting or mounting member 64 disposed to be mounted on a panel (not shown) by the angle irons 48. In this embodiment, the bellows 28 and 54 are positioned in aligned spaced relation to each other with their adjacent movable ends disposed to be linked together by the mechanical links 50 and 66, respectively, the links 50 and 66 comprising driving elements for the bellows. Each of the bellows 28 and 54 is pivotally secured by the linkages 50 and 66, respectively, as at 68 to the lever 60 intermediate of its ends. The lever 60 is pivotally mounted to the connecting portion of the U-shaped member as at 62, the free ends of the lever 60 carrying the pivotally mounted soft iron member 52 of the electromagnetic device (not shown).

The mounting of the compensating bellows 54, as illustrated in the embodiment of Fig. 1, is to be preferred where it is desired to position the electromagnetic device (not shown) directly beneath the switching apparatus 10 to effect a direct switching operation of the switching apparatus. However, where it is not necessary to position the electromagnetic device directly beneath the switching apparatus 10 and where the compensating bellows 54 has a gas volume equal to the volume of the gas in the space of the gas chamber 18 and the well 24, the embodiment illustrated in Fig. 2 is preferred, both of the bellows working on and from the same pivot. The arrangement of Fig. 2 also permits a somewhat more compact unit than the arrangement of Fig. 1.

Referring to Fig. 3, there is illustrated a regulating system which utilizes the compensated switching apparatus of this invention. In this system, a generator 70 is shown, the voltage of which it is desired to maintain substantially constant. The generator 70 may be driven from any suitable source of power, such as a motor (not shown) and comprises the armature winding 72 and the shunt field winding 74. Connected in series with the shunt field winding 74 is a rheostat 76 formed of a plurality of sections disposed to be cut in or shunted from circuit with the field winding 74. In order to control the number of sections of the rheostat 76 which are cut in circuit with the field winding 74, the switching apparatus 10 of this invention is disposed with its staggered conductor members 14 so connected by leads 78 to the different sections of the rheostat 76 that as the column of mercury is forced upwardly through the well, it progressively bridges the conductor members 14 to shunt additional sections of the rheostat 76. A spring member 80 is provided as illustrated for normally forcing the bellows 28 upwardly to force the mercury a predetermined distance within the well so that at all times it at least bridges a predetermined number of the conductor members 14.

An electromagnetic device 82 comprising the core member 84 and the winding 86 and utilizing the member 52 as its armature are so associated with the switching apparatus 10 that as the voltage of the generator 70 increases and consequently the energization of the winding 86 increases, pressure on the bellows is decreased to permit the mercury column to fall within the well 24 of the apparatus shown in Fig. 1 whereby more of the sections of the rheostat 76 will be cut in circuit with the field winding 74 to decrease its energization and consequently decrease the generator voltage. Conversely, if the voltage of the generator 70 decreases, the energization of the winding 86 is decreased and the spring 80 actuates the bellows 28 upwardly to force the mercury into the well and progressively bridge the conductor members 14 thereby progressively shunting additional sections of the rheostat 76 from circuit with the field windings 74 to increase the energization of the field winding 74 and increase the voltage of the generator 70.

Throughout the operation of the switching apparatus, by a change in the voltage of the generator 70, the compensating bellows 54 functions to provide a moment about the pivot 62 of the lever arm 60 which is substantially equal and opposite to the moment of the bellows 28 about the pivot 62. These moments are simultaneously changed by any change in temperature or atmospheric pressure and remain substantially equal and opposite in effect about the pivot 62 to maintain the switching apparatus 10 substantially unaffected by any change in the temperature or atmospheric pressure which might be encountered when the switching apparatus is in service. In effect, the compensating bellows 54 of either of the embodiments of Figs. 1 or 2 is responsive to a change in the temperature or atmospheric pressure for applying a force to the bellows 28 which is substantially equal and opposite to the force of the gas within the switching apparatus 10 to maintain the operation of the switching apparatus substantially unaffected by changes in the temperature or atmospheric pressure.

By using the compensated switching apparatus of this invention, the requirements for the electromagnetic device are simplified since such electromagnetic devices need not be adjusted to have a high sensitivity outside of its normal mode of operation. Further, a large number of switching operations can be accomplished with very little equipment because of the large number of conductor members stacked in the small space, the compensating apparatus making it possible to utilize such a switching apparatus as it tends to prevent variations in the mercury column within the switching apparatus due to changes in temperature or atmospheric pressure.

I claim as my invention:

1. In a sealed switching apparatus having a plurality of conductor members disposed in spaced relation, in combination, a bellows associated with the conductor members, a conducting liquid carried in the bellows, the bellows being so disposed as to be operated to effect a movement of the conducting liquid in the sealed apparatus to progressively bridge the conductor members, a gas capable of reducing arcing carried in the sealed apparatus associated with the conductor members and exerting a force on the conducting liquid, the gas being affected by a change in temperature or atmospheric pressure to change its volume and force to effect a movement of the bellows, and means external of the bellows responsive to the change in the temperature or atmospheric pressure for applying a force to the bellows which is substantially equal and opposite to the force of the gas to maintain the operation of the switching apparatus substantially unaffected by the change in the temperature or atmospheric pressure.

2. In a switching apparatus, a well adapted to receive a conducting liquid, the well being formed of a stack of alternately disposed conductor members and insulating spacer members having aligned openings therein, a bellows disposed at one end of the stack communicating with the well, a conducting liquid carried in the bellows, the bellows being disposed for operation to deliver the conducting liquid into the well to progressively bridge the conductor members, means for closing the well at the other end of the stack, a gas capable of reducing arcing carried in the well above the conducting liquid, the gas being affected by a change in temperature or atmospheric pressure to change its volume and force to effect a movement of the bellows, and means external of the stack and bellows responsive to the change in the temperature or atmospheric pressure for applying a force to the bellows which is substantially equal and opposite to the force of the gas to maintain the operation of the switching apparatus substantially unaffected by the change in the temperature or atmospheric pressure.

3. In a sealed switching apparatus having a plurality of conductor members disposed in spaced relation, in combination, a bellows associated with the conductor members, a conducting liquid carried in the bellows, the bellows being so disposed as to be operated to effect a movement of the conducting liquid in the sealed apparatus to progressively bridge the conductor members, a gas capable of reducing arcing carried in the sealed apparatus associated with the conductor members and exerting a force on the conducting liquid, the gas being affected by a change in temperature or atmospheric pressure to change its volume and force to effect a movement of the bellows, a pivotally mounted lever secured to the bellows, the lever being disposed to be moved about its pivot by a movement of the bellows, and a compensating bellows positioned in spaced relation with respect to the bellows containing the conducting liquid and secured to the pivotally mounted lever, the compensating bellows being responsive to the change in the temperature or atmospheric pressure and disposed to effect a movement of the lever about its pivot opposite to the movement caused by the change in the force of the gas, each of the bellows secured to the lever having a movement about the pivot when the temperature or atmospheric pressure is changed which is substantially equal and opposite to the other to maintain the operation of the switching apparatus substantially unaffected by said change.

4. In a switching apparatus, a well adapted to receive a conducting liquid, the well being formed of a stack of alternately disposed conductor members and insulating spacer members having aligned openings therein, a bellows disposed at one end of the stack communicating with the well, a conducting liquid carried in the bellows, the bellows being disposed for operation to deliver the conducting liquid into the well to progressively bridge the conductor members, means for closing the well at the other end of the stack, a gas capable of reducing arcing carried in the well above the conducting liquid, the gas being affected by a change in temperature or atmospheric pressure to change its volume and force to effect a movement of the bellows, a pivotally mounted lever secured to the bellows, the lever being disposed to be moved about its pivot by a movement of the bellows, and a compensating bellows positioned in spaced relation with respect to the bellows containing the conducting liquid and secured to the pivotally mounted lever, the compensating bellows being responsive to the change in the temperature or atmospheric pressure and disposed to effect a movement of the lever about its pivot opposite to the movement caused by the change in the force of the gas, each of the bellows secured to the lever having a moment about the pivot when the temperature or atmospheric pressure is changed which is substantially equal and opposite to the other to maintain the operation of the switching apparatus substantially unaffected by said change.

5. In a switching apparatus, a plurality of conductor members disposed in spaced relation, a plurality of insulating spacer members stacked alternately with the conductor members, a bonding material applied to the conductor members and the spacer members to bond them into a sealed integral structure, each of the conductor members and spacer members having an opening therein aligned to provide a well, a bellows disposed at one end of the stack communicating with the well, a liquid carried in the bellows, the liquid being a good electrical conductor, the bellows being disposed for operation to deliver the conducting liquid into the well to progressively bridge the conductor members, a chamber disposed at the other end of the stack communicating with the well, a gas capable of reducing arcing carried in the chamber and well above the conducting liquid, the gas being affected by a change in temperature or atmospheric pressure to change its volume and force to effect a movement of the bellows, and means external of the stack and bellows responsive to the change in the temperature or atmospheric pressure for applying a force to the bellows which is substantially equal and opposite to the force of the gas to maintain the operation of the switching apparatus substantially unaffected by the change in the temperature or atmospheric pressure.

6. In a switching apparatus, a plurality of conductor members disposed in spaced relation, a plurality of insulating spacer members stacked alternately with the conductor members, a bonding material applied to the conductor members and the spacer members to bond them into a sealed integral structure, each of the conductor members and spacer members having an opening therein aligned to provide a well, a bellows disposed at one end of the stack communicating with the well, a liquid carried in the bellows, the liquid being a good electrical conductor, the bellows being disposed for operation to deliver the conducting liquid into the well to progressively bridge the conductor members, a chamber disposed at the other end of the stack communicating with the well, a gas capable of reducing arcing carried in the chamber and well above the conducting liquid, the gas being affected by a change in temperature or atmospheric pressure to change its volume and force to effect a movement of the bellows, a pivotally mounted lever secured to the bellows, the lever being disposed to be moved about its pivot by a movement of the bellows, and a compensating bellows positioned in spaced relation with respect to the bellows containing the conducting liquid and secured to the pivotally mounted lever, the compensating bellows being responsive to the change in the temperature or atmospheric pressure and disposed to effect a movement of the lever about its pivot opposite to the movement caused by the change in the force of the gas, each of the bellows secured to the lever having a moment about the pivot when the temperature or atmospheric pressure is changed which is substantially equal and opposite to the other to maintain the operation of the switching apparatus substantially unaffected by said change.

7. In a switching apparatus, a well adapted to receive a conducting liquid, the well being formed of a stack of alternately disposed conductor members and insulating spacer members having aligned openings therein, a bellows disposed at one end of the stack communicating with the well, a conducting liquid carried in the bellows, the bellows being disposed for operation to deliver the conducting liquid into the well to progressively bridge the conductor members, means for closing the well at the other end of the stack, a gas capable of reducing arcing carried in the well above the conducting liquid, the gas being affected by a change in temperature or atmospheric pressure to change its volume and force to effect a movement of the bellows, means comprising a pivotally mounted lever secured to the bellows to operate it under predetermined conditions to deliver the conducting liquid to the well, another bellows positioned opposite the bellows containing the conducting liquid and secured to the lever, the other bellows being responsive to the change in the temperature or atmospheric pressure to effect a movement opposite to the movement of the bellows containing the conducting liquid in response to the same change, the moment of each of the bellows secured to the lever about its pivot caused by the change in the temperature or atmospheric pressure being substantially equal and opposite to thereby maintain the operation of the switching apparatus substantially unaffected by said change.

8. In a switching apparatus, a well adapted to receive a conducting liquid, the well being formed of a stack of alternately disposed conductor members and insulating spacer members having aligned openings therein, a bellows disposed at one end of the stack communicating with the well, a conducting liquid carried in the bellows, the bellows being disposed for operation to deliver the conducting liquid into the well to progressively bridge the conductor members, means for closing the well at the other end of the stack, a gas capable of reducing arcing carried in the well above the conducting liquid, the gas being affected by a change in temperature or atmospheric pressure to change its volume and force to effect a movement of the bellows, a pivotally mounted lever secured to the bellows, the lever being disposed to be moved about its pivot by a movement of the bellows, and a compensating bellows positioned in spaced relation with respect to the bellows containing the conducting liquid and secured to the lever, the compensating bellows being sealed and responsive to the change in the temperature or atmospheric pressure to effect a movement of the lever opposite to the movement of the lever by the bellows containing the conducting liquid in response to the same change, the compensating bellows being secured to the lever at a predetermined distance from the pivot to provide a moment when the temperature or atmospheric pressure is changed which is substantially equal and opposite to the moment of the bellows containing the conducting liquid in response to the same change to thereby maintain the operation of the switching apparatus substantially unaffected by the change.

KIRK A. OPLINGER.